(12) United States Patent
Harsley

(10) Patent No.: US 10,150,493 B1
(45) Date of Patent: Dec. 11, 2018

(54) MOBILITY PLATFORM FOR A SHOPPING CART

(71) Applicant: Richard E. Harsley, Gibsonton, FL (US)

(72) Inventor: Richard E. Harsley, Gibsonton, FL (US)

(*) Notice: Subject to any disclaimer, the term of this patent is extended or adjusted under 35 U.S.C. 154(b) by 0 days.

(21) Appl. No.: 15/053,039

(22) Filed: Feb. 25, 2016

Related U.S. Application Data

(60) Provisional application No. 62/120,933, filed on Feb. 26, 2015.

(51) Int. Cl.
*B62B 3/00* (2006.01)
*B62B 3/14* (2006.01)

(52) U.S. Cl.
CPC ................... *B62B 3/1468* (2013.01)

(58) Field of Classification Search
None
See application file for complete search history.

(56) References Cited

U.S. PATENT DOCUMENTS

| | | | |
|---|---|---|---|
| 3,251,543 A | 5/1966 | Bush et al. | |
| 3,265,297 A * | 8/1966 | Behrens | B62B 3/1428 235/1 D |
| 3,866,649 A | 2/1975 | Bringmann | |
| 4,274,567 A * | 6/1981 | Sawyer | A45C 15/02 108/44 |
| 4,376,502 A * | 3/1983 | Cohen | B62B 3/1464 224/411 |
| 4,655,502 A | 4/1987 | Houllis | |
| 4,685,701 A * | 8/1987 | Amundson | B62B 3/1428 224/277 |
| 4,706,975 A | 11/1987 | Arena et al. | |
| 4,805,937 A * | 2/1989 | Boucher | B62B 3/144 224/411 |
| D328,812 S | 8/1992 | Pritchett | |
| D357,784 S | 4/1995 | Ince | |
| 5,427,392 A | 6/1995 | Duer | |
| 5,429,377 A | 7/1995 | Duer | |
| 5,722,672 A | 3/1998 | Frederick | |
| 5,820,142 A | 10/1998 | Duer | |
| 6,065,764 A | 5/2000 | Moseley | |
| 6,076,791 A | 6/2000 | Rand et al. | |
| 6,453,588 B1 * | 9/2002 | Lykens | G09F 7/04 280/33.992 |

(Continued)

*Primary Examiner* — James A Shriver, II
*Assistant Examiner* — Hilary L Johns
(74) *Attorney, Agent, or Firm* — Frijouf, Rust & Pyle, P.A.

(57) ABSTRACT

A mobility platform is disclosed for a shopping cart. The mobility platform comprises a platform having an upper surface, a lower surface, a front edge, a rear edge, a primary side and a secondary side. A connector is secured to the platform. The lower surface of the platform abuts the cart handle and the connector engages the cart handle for defining a platform lock and terminating displacement of the platform relative to the shopping cart. A deformable layer is coupled to the upper surface of the platform for cushioning contact between the platform and the individual. The deformable layer engages the individual for defining a cart crutch. The cart crutch assists the individual by transferring weight of the individual to the cart and improving the balance of the individual while in contact with the deformable layer.

13 Claims, 14 Drawing Sheets

(56) References Cited

U.S. PATENT DOCUMENTS

| | | | |
|---|---|---|---|
| 6,685,200 B1 * | 2/2004 | Giannoni | B62B 3/02 108/57.16 |
| 6,817,066 B1 | 11/2004 | Williams et al. | |
| 6,832,766 B2 * | 12/2004 | Stokes | B62B 3/1456 150/154 |
| 6,936,022 B1 * | 8/2005 | Root | A47B 21/0371 248/118 |
| 6,981,707 B1 | 1/2006 | Dandy | |
| 7,281,718 B2 | 10/2007 | Malchow | |
| 7,431,396 B1 * | 10/2008 | Dasso | A47C 7/546 297/227 |
| 7,568,707 B2 | 8/2009 | Kolpien | |
| 7,611,156 B2 | 11/2009 | Dunser | |
| D636,211 S * | 4/2011 | Kolander | D6/601 |
| 8,109,524 B1 | 2/2012 | Toohey et al. | |
| 8,136,275 B2 | 3/2012 | Sonnendorfer et al. | |
| 8,424,138 B1 * | 4/2013 | Pinnell | B62B 3/1444 5/118 |
| 8,650,715 B2 | 2/2014 | Sonnendorfer et al. | |
| 8,931,744 B1 * | 1/2015 | McLafferty | B62B 5/06 248/118 |
| 9,289,347 B2 * | 3/2016 | Powell | A61H 3/04 |
| 2003/0039037 A1 * | 2/2003 | Miranda | B62B 3/1428 359/811 |
| 2004/0080129 A1 | 3/2004 | Myers et al. | |
| 2004/0075318 A1 * | 4/2004 | Wroobel | B62B 3/144 297/256.17 |
| 2004/0216339 A1 * | 11/2004 | Garberg | A47F 5/137 40/308 |
| 2005/0156395 A1 * | 7/2005 | Bohn | A61H 3/04 280/87.021 |
| 2006/0202438 A1 | 9/2006 | Helmy et al. | |
| 2007/0273113 A1 * | 11/2007 | Muir | A47F 10/02 280/33.992 |
| 2008/0191435 A1 | 8/2008 | Guercia et al. | |
| 2008/0303230 A1 | 12/2008 | Somberg | |
| 2009/0140505 A1 * | 6/2009 | Fryer | B62B 3/1408 280/33.994 |
| 2010/0133768 A1 | 6/2010 | Sonnendorfer et al. | |
| 2011/0181007 A1 * | 7/2011 | Caruso | B62B 3/1472 280/33.992 |
| 2013/0341370 A1 * | 12/2013 | Larson | B62B 3/1428 224/411 |
| 2016/0339937 A1 * | 11/2016 | Dyer | B62B 3/144 |

* cited by examiner

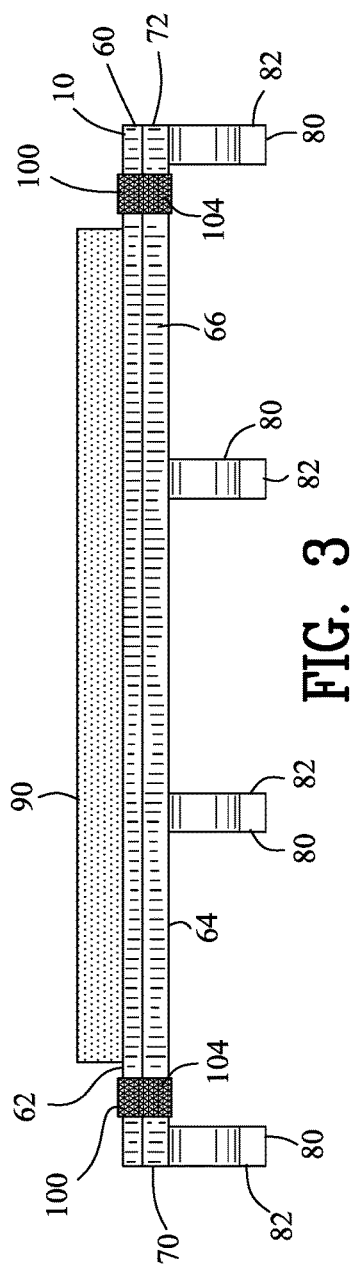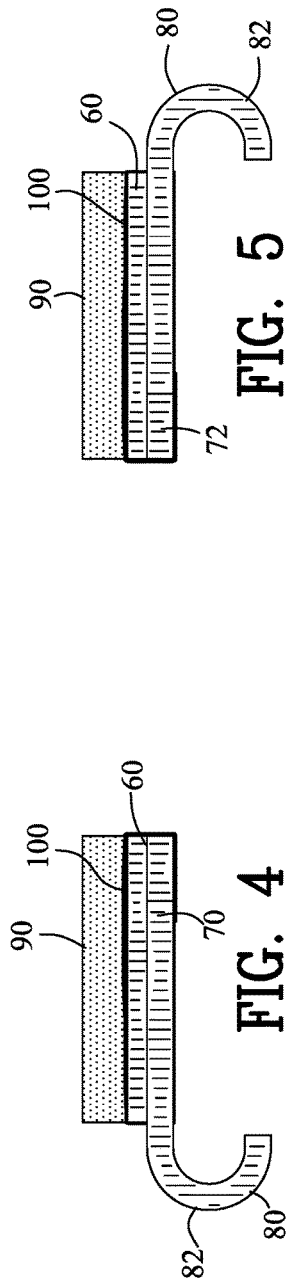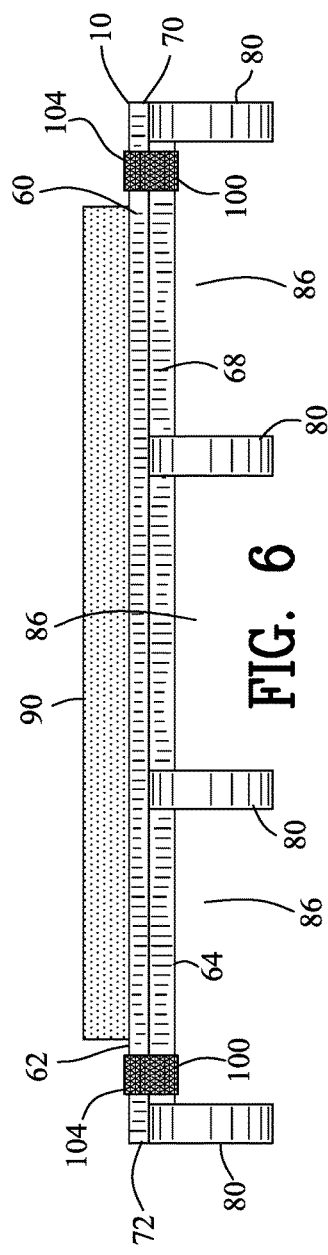

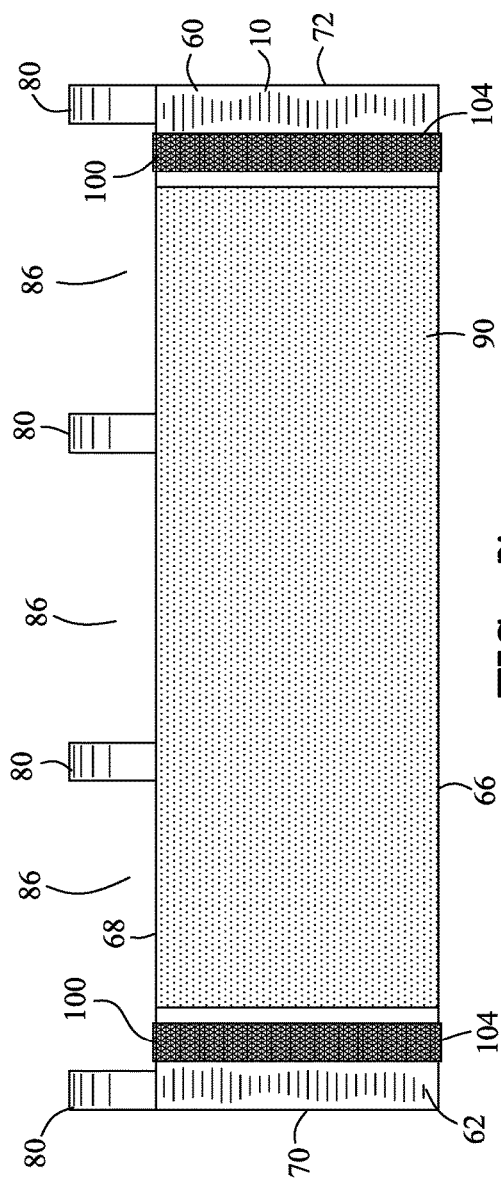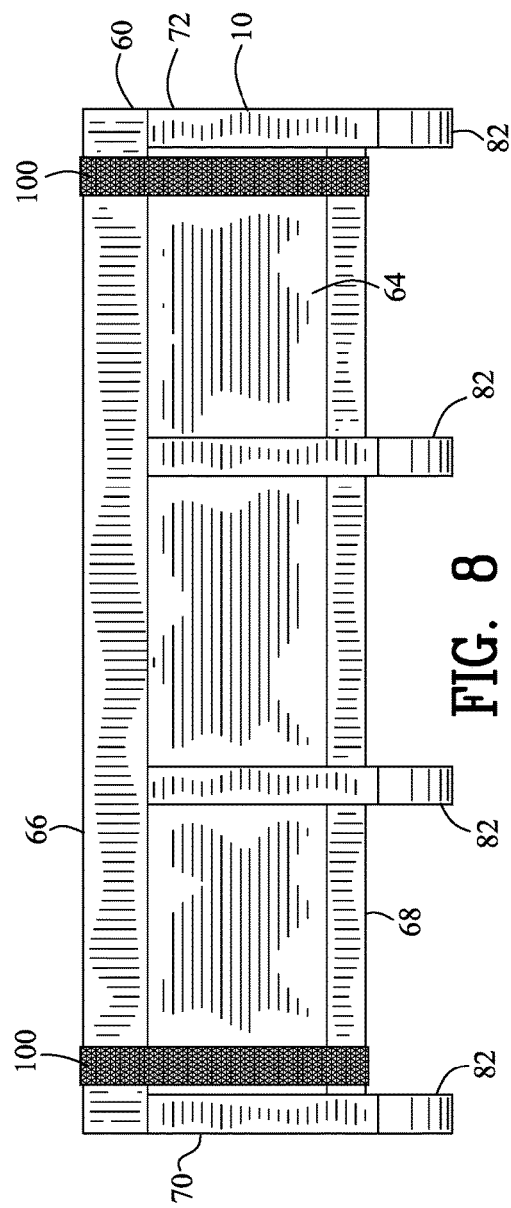

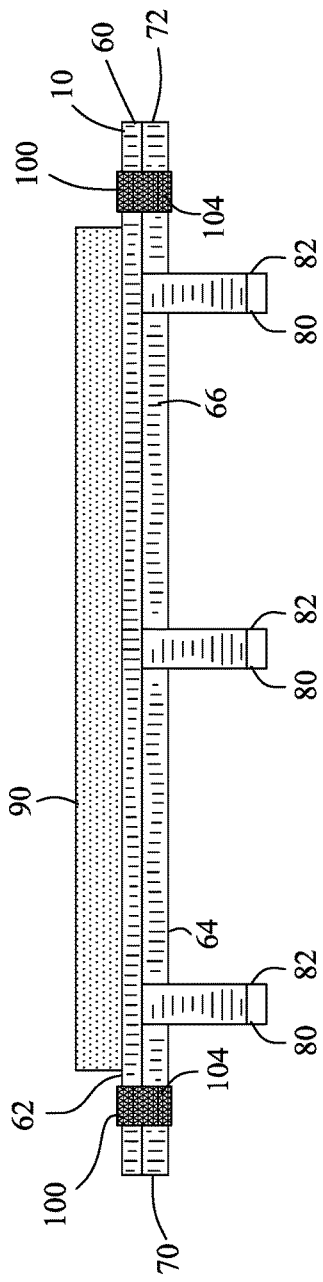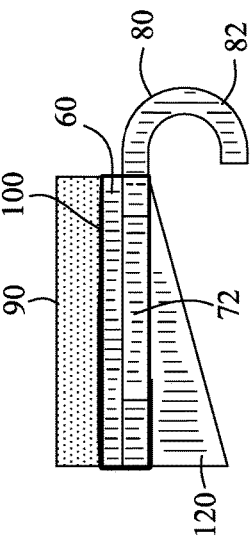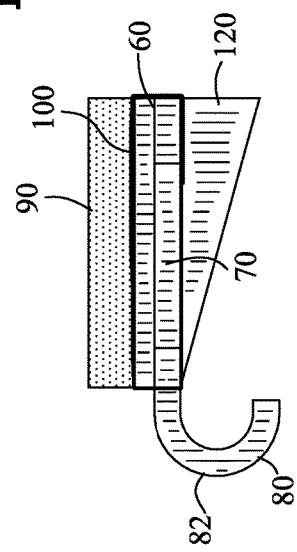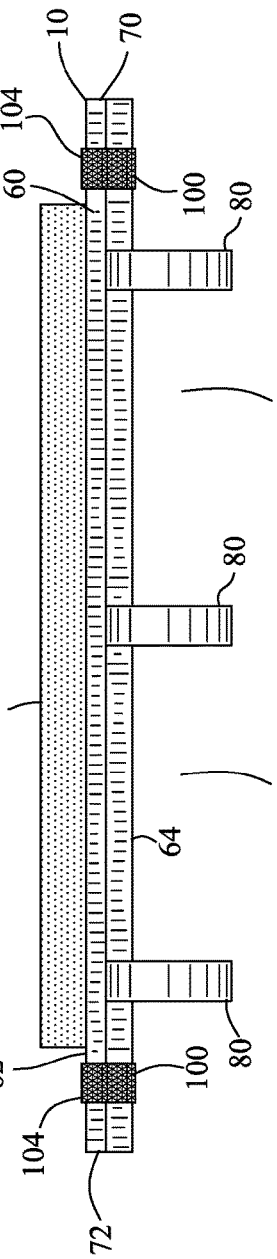
FIG. 14
FIG. 15
FIG. 16
FIG. 17

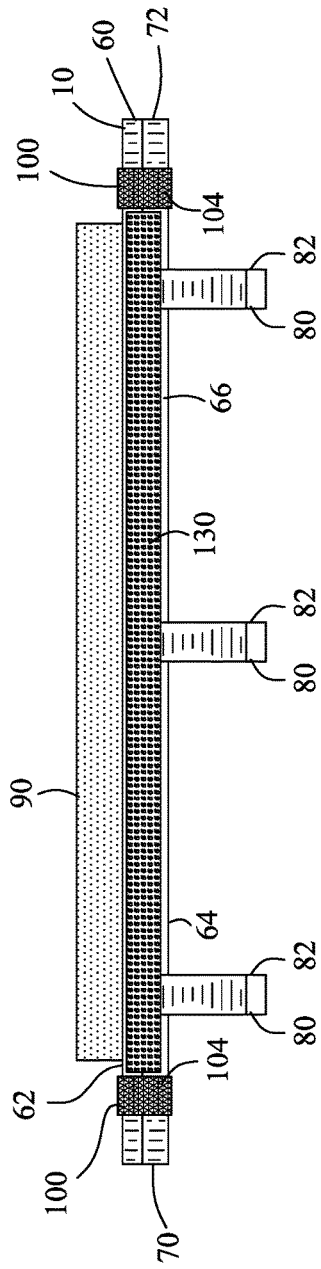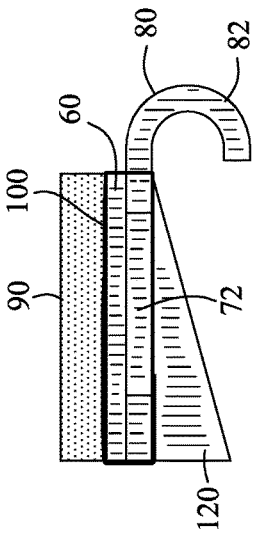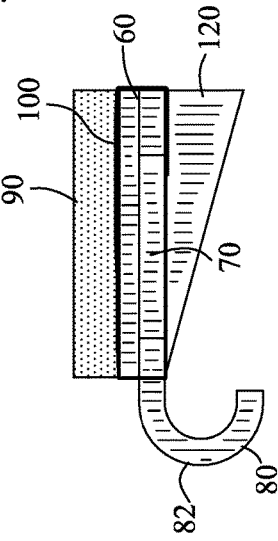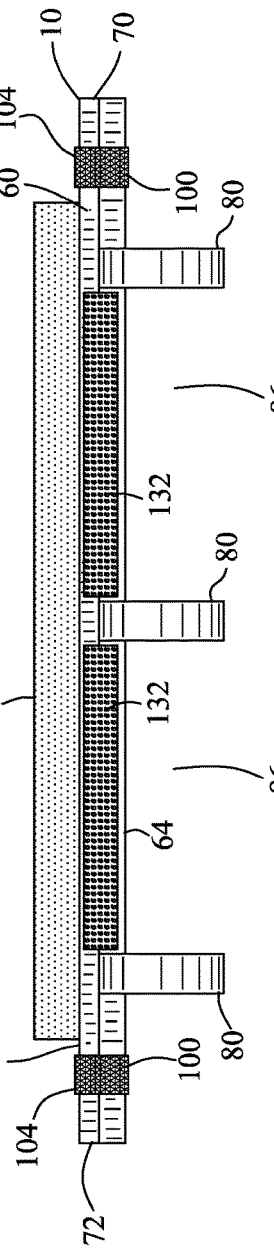

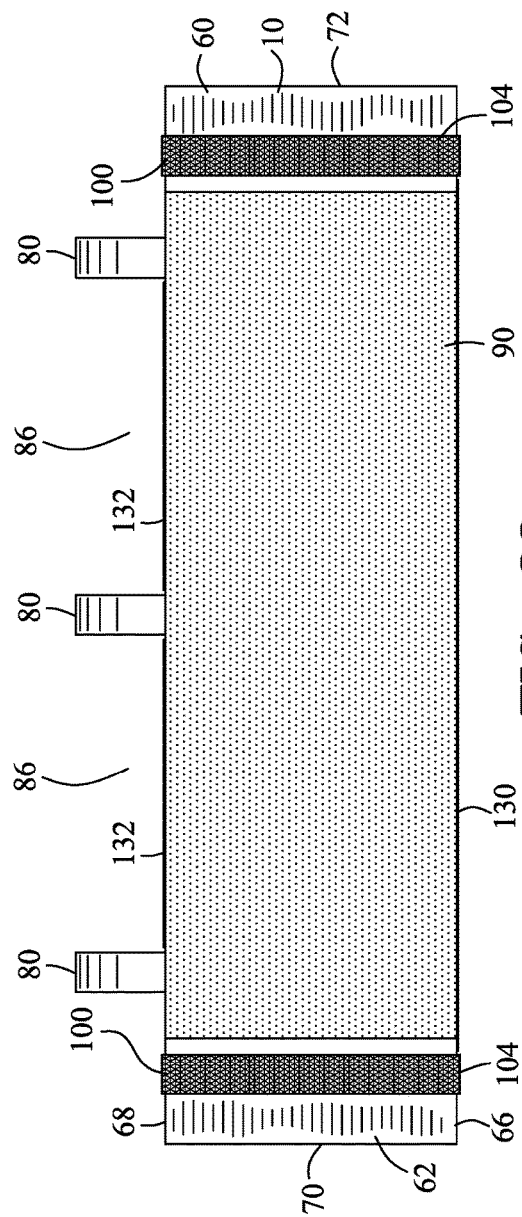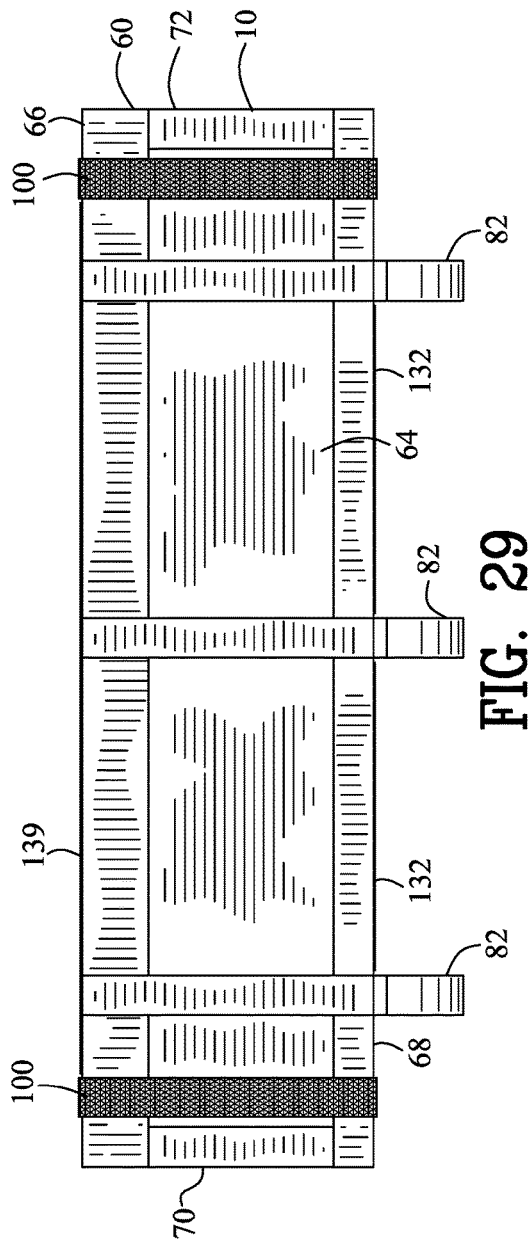

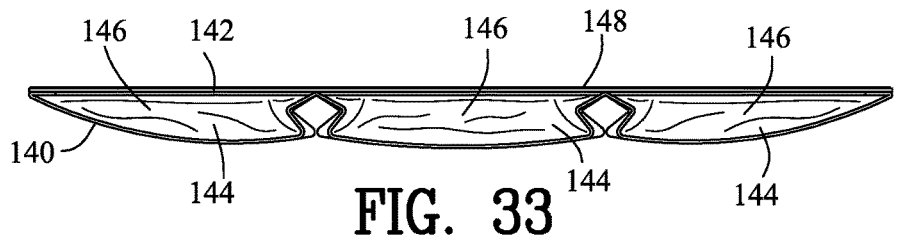
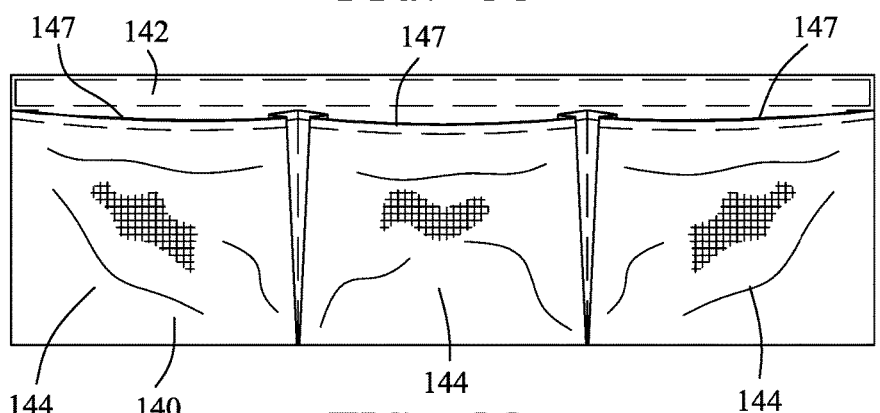
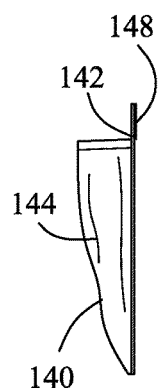
FIG. 33
FIG. 32
FIG. 34
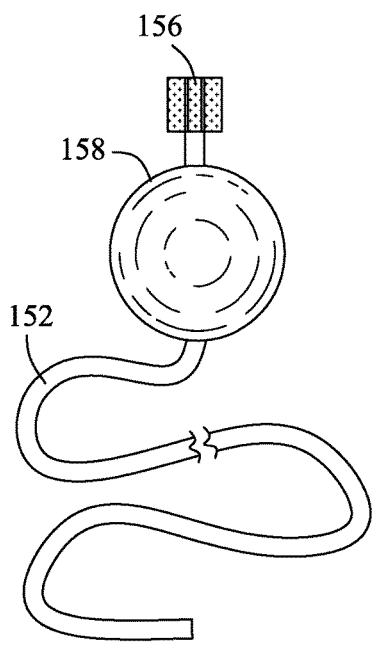
FIG. 35
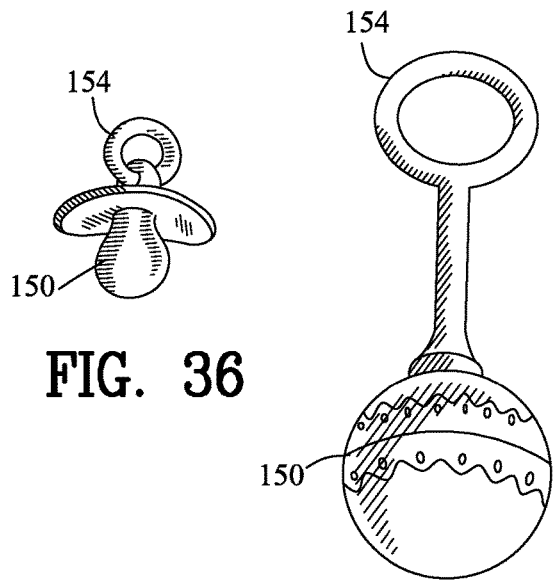
FIG. 36
FIG. 37

MOBILITY PLATFORM FOR A SHOPPING CART

CROSS-REFERENCE TO RELATED APPLICATIONS

This application claims benefit of U.S. Patent Provisional Application No. 62/120,933 filed Feb. 26, 2015. All subject matter set forth in Provisional Application No. 62/120,933 is hereby incorporated by reference into the present application as if fully set forth herein.

BACKGROUND OF THE INVENTION

Field of the Invention

This invention relates to a support device and more particularly to a mobility platform for a shopping cart.

Background of the Invention

Since first introduced in 1937, the popularity and use of shopping carts has continually increased. Variants on the standard designs and configurations have likewise been introduced to the marketplace, as is well known to those skilled in the art.

The needs of physically challenged persons relative to the use of shopping carts has been addressed by several prior art devices. Motorized shopping carts comprising a shopping cart combined with a powerchair or scooter type device have addressed the concerns of persons requiring these devices for movement. Most recently, an autonomous, self driven shopping cart system which follows a wheelchair has been developed.

These devices have more than adequately addressed the needs of persons requiring physical transport. However, the needs of persons with limited mobility impairment have not been adequately addressed. These persons require minimal support for balance, such as provided by walker devices, canes and the like.

There have been many in the prior art who have attempted to solve these problems with varying degrees of success. None, however completely satisfies the requirements for a complete solution to the aforestated problem. The following U.S. Patents are attempts of the prior art to solve this problem.

U.S. Pat. No. 43,251,543 to Bush, et al. discloses a shopping cart including side supports and a handle. The handle has a longitudinal bore therethrough, with a support rod positioned within the bore and connected to the side supports. An attachment is provided, comprising a display panel for indicating the location of items for sale, and a space on the display panel for displaying a advertising. A fastening means provides a method for attaching papers thereto, and an adding machine integral with the attachment provides a running total of the items selected for purchase. A number of support flanges extend downward from the attachment have groves therein for receiving the support rod, and a means connected to the support rod secures the flanges against the handle in fixed relation thereto.

U.S. Pat. No. 3,866,649 to Bringmann discloses a removable shopping cart handle cover containing a string of ornaments useful when shopping with a child. The cover provides a sanitary surrounding for the child and the ornaments to keep him amused.

U.S. Pat. No. 4,655,502 to Houllis discloses relates to a foldable seat cushion having at least one blank for use in the seat basket of a shopping cart. The device is constructed so that the back portion of the seat cushion can be adjusted for the width of the seat basket and affixed in position thereupon, while the front portion of the seat cushion may be rolled about the handle of the shopping cart and secured with an adjustable fastener. The invention includes a pair of apertures provided for legs of the child through the seat cushion, a seat belt for retention of the infant therein and accessory tethering straps for the application of toys or like objects for the entertainment of the child while seated upon the seat cushion.

U.S. Pat. No. 4,706,975 to Arena, et al. discloses a shopping for direct connection to a conventional shopping cart to allow the cart to be safely utilized by and serve as a support for disabled persons. The attachment comprises a pair of spaced tubular members attachable to the shopping cart. Each of the tubular members has a wheel mounted to a lower portion thereof. The tubular members are formed to have a horizontal support section for supporting a portion of the weight of the user. The horizontal support section preferably extends forward of the wheels attached to the tubular members to provide greater support and stability to the user. A braking mechanism is disposed in engageable frictional contact with the wheel and a braking mechanism handle is provided for regulating the operation of the braking mechanism. Breaking mechanism linkage is provided to connect the braking mechanism with the actuator handle such that said braking mechanism is normally engaged to the wheel to oppose movement of the wheel, and released from engagement upon movement of the actuator handle.

U.S. Pat. No. 4,805,937 to Boucher, et al. discloses a handle cover for a shopping cart formed from a padded fabric strip. VELCRO fasteners are provided for securing the strip around the handle of a conventional shopping cart. The cover provides protection against germs, dirt and disease to small children riding in the shopping cart child seat. Various toys for the amusement of the child may be secured to the fabric cover. A seat cover for providing added protection and comfort to a child riding in a shopping cart seat includes strap fasteners for attachment to the handle cover. The seat cover and handle cover may be folded to compact sizes for convenient storage and transportation.

U.S. Pat. No. 5,427,392 to Duer discloses a sanitary wrapping for covering the handles of shopping carts and the like. The wrapping may be provided either in the form of a portable wrapping which can be carried from store by the individual shopper and attached to the shopping cart handles in the store by various adhesive arrangements along the edges or as disposable or throwaway coverings obtained and used in each store. The preferred fastening means takes the form of so-called Veicro®. fastened wrappers. Various improvements of the basic tubular sanitary protection can be provided, including the use of flaps on the ends to cover more of the handle and sides of the shopping cart plus slits in the structure of the handle covering so it can be adapted to handles of various lengths. The sanitary wrapping can also take the form of a paper or light plastic wrapping which can be dispensed from a dispenser provided near the storage place on the premises of a store for shopping carts. The customer can withdraw the protectors one at a time from such dispenser. Strips of individual sanitary wrappings can be made in several different ways and several variations of the strips can also be used, including the use of flaps extending from the sides for shielding the sides of the cart as well. The sanitary wrapping may also incorporate an inner removable and disposable secondary shield layer.

U.S. Pat. No. 5,429,377 to Duer discloses a sanitary wrapping for covering the handles of shopping carts. The wrapping may be provided either in the form of a portable wrapping which can be carried from store to store by the individual shopper and attached to the handles of shopping carts in the store by various adhesive arrangements along the edges or as disposable or recyclable coverings obtained and used in each store. The preferred fastening means takes the form of so-called Velcro fastened wrappers. Various improvements of the basic tubular sanitary protection can be provided, including the use of flaps on the ends to cover more of the handle and sides of the shopping cart, plus slits in the structure of the handle covering so it can be adapted to handles of various lengths. A preferred form incorporates a coupon pouch into which the entire covering may be folded for storage or transportation. The sanitary wrapping can also take the form of sturdy resilient split plastic tubes which can be dispensed from a dispenser provided near the storage place on the premises of a store for shopping carts. The customer can withdraw the protectors one at a time from such dispenser. Recycling of such resilient plastic covers may be had. The sanitary wrapping may also incorporate an inner or outer removable and disposable secondary shield layer.

U.S. Pat. No. 5,722,672 to Frederick discloses a removable protective cover which can be attached to a shopping cart handle or a rented stroller. This alleviates disruption in shopping with a small child who is likely to chew on parts of a shopping cart or stroller. The cover can be removed, and is washable and reusable. Because of its composition, the cover can be easily folded and placed in a purse, diaper bag, or pocket. The cover may also include a T-shaped member that can provide further protection in addition to serving as a holding place for items such as a shopping list or coupons. Furthermore, the cover may include provisions for the attachment of toys, etc., and the cover itself may be structured to provide a child entertainment function.

U.S. Pat. No. 5,820,142 to Duer discloses sanitary coverings for the handles of hand-propelled carts. The coverings may be portable. The coverings may be disposable or recyclable. Various fastening arrangements may be used along the edges of the sanitary coverings to allow the coverings to be securely wrapped about the handles of hand-propelled carts. The preferred arrangement utilizes a partially closed crescent shaped resilient plastic sanitary covering. Various improvements upon the basic tubular sanitary coverings include the use of flaps on the ends thereof to cover larger portions of the surface areas of the handles as well as the sides of carts, and flexible corrugated portions in the structure of the sanitary coverings to accommodate handles and supporting members of various types. The sanitary coverings may also take the form of recyclable, sturdy, resilient, split plastic tubes capable of being dispensed one-at-a-time from dispensers located on the premises of commercial establishments.

U.S. Pat. No. 6,065,764 to Moseley discloses a reusable sanitary cover for a conventional shopping cart handle, to protect shoppers and their infants or small children from the germ-laden surface thereof. In the preferred embodiment, the cover comprises a flexible sheet of washable material that is shaped into a cylinder that securely fits a shopping cart handle. A slit allows a customer to press the cover onto the handle. The material used for the sheet promotes a child's safe, sanitary teething or oral contact with the cover. Also, the cover incorporates amusing distractive features to occupy infants and children while the parent or adult shops. An alternative embodiment of the cover comprises two rectangular transparent sheets of material having snap members that secure the cover onto the handle during use and defining a hermetic, watertight enclosure that contains a volume of transparent fluid, preferably purified water. Glitter particles and novelty-shaped pieces of brightly-colored foil or sheet plastic are suspended in the fluid, and are visible through it and the transparent material of sheets, providing another amusing distraction for the infant or small child seated in the shopping cart.

U.S. Pat. No. 6,076,791 to Rand, et al. discloses a device for placing information/advertising on a shopping trolley comprising a support element with a display surface, and brackets which grip around the shopping trolley handle. The brackets are shaped like supports with ergonomically-shaped handles, and they protrude down and out from the underside or side edges of the support element.

U.S. Pat. No. 6,817,066 to Williams, et al. discloses a sanitary grip apparatus for preventing direct contact with unsanitary shopping cart handles that may be installed without touching the shopping cart handle directly. To attain this, a section of foam tubing having a longitudinal slit therethrough is provided, where a pair of pull-tabs is arranged on either side of the slit such that the tubing can be pulled open and installed onto the shopping cart handle. In an embodiment, the grip may include clip, pocket, pouch, attachment region, toys, mirror, book, key ring, or calculator. Also disclosed is a method for using a shopping cart without touching it directly.

U.S. Pat. No. 6,832,766 to Stokes discloses a protective covering for a handle comprising a front portion, comprised of a soft material and a rear portion, comprised of a water resistant material, attached to the front portion. The protective covering may be attached in a manner so that the rear portion comes in contact with the handle and thus provides a protective barrier against moisture and germs. The protective covering may be removably attached to the handle. The protective covering may be comprised of an attachment portion, into which a bottle or non-spill child's cup can be inserted. At least one object, such as an ornamental object or child play object, can be attached to the front portion.

U.S. Pat. No. 6,981,707 to Dandy discloses an adjustable portable protective cover for covering a shopping cart handle including three elongated resilient tubular member telescoped together. The members include stops for retaining the members together in the fully extended position. The inner and outer members have a radially outwardly protuberance at a free end thereof. The members can be collapsed to a minimum length for storage and carrying. The members are formed of an easily cleaned material so that the cover can be reused.

U.S. Pat. No. 7,281,718 to Malchow discloses a handle shield for placement about the handle of a conventional shopping cart. The handle shield is formed of sheet material that forms a sleeve that surrounds the handle to shield the hands of the user of the cart from contacting the handle. A hang tag is suspended from the handle that bears advertisements, coupons, and/or bar codes for displaying to the shopper the different goods available in the store and for redeeming at the checkout counter of the store.

U.S. Pat. No. 7,568,707 to Kolpien discloses a method of sanitizing a handle on a mobile push cart which includes the steps of positioning, in at least one preselected location, a storage container capable of holding a predetermined plurality of covers, obtaining, from the storage container one cover and detachably positioning the cover onto the handle of the mobile push cart. The invention also provides a method of advertising product or event in combination with the mobile push cart, wherein advertising information is provided on the cover which is detachably positioned onto the handle of the mobile push cart. The invention additionally provides a novel protective cover for the mobile push cart which includes provisions for supporting various accessories usable in a supermarket and the like.

U.S. Pat. No. 7,611,156 to Dunser discloses a shopping cart handle and sanitizing apparatus and method including a housing with a sanitizing fluid reservoir mounted to slidably encircle the cart handle and dispense the fluid onto the handle from applicators in the housing that contract the handle as the housing is moved to and fro. A pump mechanism transfers fluid from the reservoir to the applicators.

U.S. Pat. No. 8,109,524 to Toohey, et al. discloses a shopping cart handle cover including a generally elongated, flexible cover base panel; a generally elongated, flexible cover top panel carried by the cover base panel; and a cover interior defined by and between the cover base panel and the cover top panel. The shopping cart handle cover is designed to slide over a shopping cart handle. The handle cover can be fabricated of a material having elastic properties, allowing the user to stretch the handle cover over the cart handle. The handle cover becomes taut over the cart handle when in a relaxed state. At least one panel handle flap can be provided through the top and base panels. The flap wraps around the cart handle providing protection to the user from bacteria, other microorganisms, and other contaminants. A plurality of handle covers may be provided by joining adjacent covers, providing a perforation therebetween, and rolling the covers onto a core for dispensing.

U.S. Pat. No. 8,136,275 to Sonnendorfer, et al. discloses a display element for attaching advertising to the handle of a shopping cart or the like. The display element includes a base body having a recess for inserting advertising media in a flat manner and fastening elements for fastening the display element on the handle bar, or the handle bar mounts, of a shopping cart. The display element is made of half shell-shaped parts, which in the joined state surround the handle bar, or the handle bar mount, in the shape of an enclosed box profile. The half shell-shaped parts are non-positively or positively connected to the handle bar.

U.S. Pat. No. 8,650,715 to Sonnendorfer, et al. discloses a shell for a handle tube of a shopping cart or trolley. The shell has improved properties compared with a conventional, round, simple shell and has zones made of different materials.

United States Patent Application 2004/0080129 to Myers, et at discloses a small writing tablet device which can be installed as an accessory device for new shopping carts from a manufacturer or can be added to existing shopping carts at the various markets and stores without any difficulty.

United States Patent Application 2006/0202438 to Helmy, et al. discloses a disposable Sanitary Shopping Cart Handle Cover for publicly used carts, carry baskets, and rental strollers, addresses the health risks consumers face by providing a barrier between the shoppers hands and the thousands of strains of germs/bacteria present on the surface of said handles. The preferred embodiment is a relatively thin rectangle of material, consisting of a double sided sheet composed of a front/top side, possibly made of a tissue type material with an attached back/bottom side, possibly made of an isolating plastic material which attaches directly to the handle in use, thereby providing germ-conscious individuals with an option to solve the problem of bacteria exposure, in a way not previously afforded to the public.

United States Patent Application 2007/0273113 to Muir discloses a work station insert for a shopping cart having a large table top useful for writing on, and storage drawer beneath the table top. The insert hooks over the push handle of the cart, so that the insert cannot move rearward or tip forward; it is supported near its center by the seat back of a cart having a folding child seat, or by a tube which supports the back of a fixed seat. The storage drawer can be pulled out forward from beneath the table top, and a trash deflector is provided beneath a cutout at the rear of the table top to direct trash into the shopping cart receptacle. Alternative embodiments are provided for different styles of shopping carts.

United States Patent Application 2008/0191435 to Guercia, et al. discloses a single-use length adjustable disposable sanitary cover for temporarily housing a handle of a shopping device or hospital cart. The disposable sanitary cover includes a flexible cylindrical sleeve having an elongated slit and at least one length adjustment means integrated within the cylindrical sleeve adapted for adjusting the length of the sleeve to correspond to the length of the shopping device or hospital cart. Length adjustment means may comprise at least one accordion section, perforated section, telescoping section or folded section. Stabilizing means to mitigate movement of the cylindrical sleeve along the cart handle may be provided. The handle of the shopping device or hospital cart is received through the elongated slit, lengthwise adjustment is imparted, and the handle is effectively housed within the cylindrical sleeve, thereby mitigating viral and germ contact between the handle of the device or cart and the shopper's or hospital worker's hands. Preferably, the lengthwise adjustable disposable cover includes a tab member for removal from the handle of the shopping cart.

United States Patent Application 2008/0303230 to Somberg discloses a wrap or cover for a handle to protect against germs or bacteria on the handle. The wrap or cover includes a pair of layers of a soft washable material having a length greater than the width and joined at their periphery by a stitching of the respective materials that comprise the layers so as to form a unitary wrap layer. A set of fasteners is attached respectively to opposite sides of the wrap layer. Each fastener includes a strip of fastener material having a length greater than its width. Each fastener comprises a Velcro material that includes a Velcro loop and a Velcro hook material.

United States Patent Application 2010/0133768 to Sonnendorfer, et al. discloses a shopping trolley having castors and a handle, the surface of which consists of plastic. The surface of the handle consists of one or more different materials, at least one of said materials having conductive properties.

U.S. Design Patent D328,812 to Pritchett discloses the ornamental design for a handle cover for a shopping cart, as shown and described.

U.S. Design Patent D357,784 to Ince discloses the ornamental design for a shopping cart handle cover, as shown and described.

Although the aforementioned prior art have contributed to the development of the art of shopping cart accessories, none of these prior art patents have solved the needs of this art.

Therefore, it is an object of the present invention to provide an improved device for enabling physically challenged persons to utilize a shopping cart.

Another object of this invention is to provide an improved device for providing a stability support for persons requiring stabilization when walking.

Another object of this invention is to provide an improved device that is simple to install and remove.

Another object of this invention is to provide an improved device that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved mobility platform for a shopping cart. The shopping cart has a cart basket supported by a plurality of wheels and a cart handle for the individual to propel the shopping cart. The mobility platform comprises a platform having an upper surface, a lower surface, a front edge, a rear edge, a primary side and a secondary side. A connector is secured to the platform. The lower surface of the platform abuts the cart handle and the connector engages the cart handle fix defining a platform lock and terminating displacement of the platform relative to the shopping cart. A deformable layer is coupled to the upper surface of the platform for cushioning contact between the platform and the individual. The deformable layer engages the individual for defining a cart crutch. The cart crutch assists the individual by transferring weight of the individual to the cart and improving the balance of the individual while in contact with the deformable layer.

In a more specific embodiment of the invention, the connector includes a plurality of hooks extending from the rear edge and below the lower surface for encircling a portion of the cart handle.

In a more specific embodiment of the invention, a plurality of straps are secured to the platform. The plurality of straps engage the cart for defining a second platform lock and terminating displacement of the platform relative to the shopping cart.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 3 is a front view of FIG. 1;
FIG. 4 is a left side view of FIG. 1;
FIG. 5 is a right side view of FIG, 1;
FIG. 6 is a rear view of FIG. 1;
FIG. 7 is a top view of FIG. 1;
FIG. 8 is a bottom view of FIG. 1;
FIG. 14 is a front view of FIG. 12;
FIG. 15 is a left side view of FIG. 12;
FIG. 16 is a right side view of FIG. 12;
FIG. 17 is a rear view of FIG. 12;
FIG. 24 is a front view of FIG. 22;
FIG. 25 is a left side view of FIG. 22;
FIG. 26 is a right side view of FIG. 22;
FIG. 27 is a rear view of FIG. 22;
FIG. 28 is a top view of FIG. 22;
FIG. 29 is a bottom view of FIG. 22;
FIG. 32 is a front view of a pouch;
FIG. 33 is a top view of FIG. 32;
FIG. 34 is a right side view of FIG. 32;
FIG. 35 is a view of an amusement tether;
FIG. 36 is a view of a first amusement item;
and
FIG. 37 is a view of a second amusement item,
Similar reference characters refer to similar parts throughout the several Figures of the drawings.

DETAILED DISCUSSION

Figure 1:
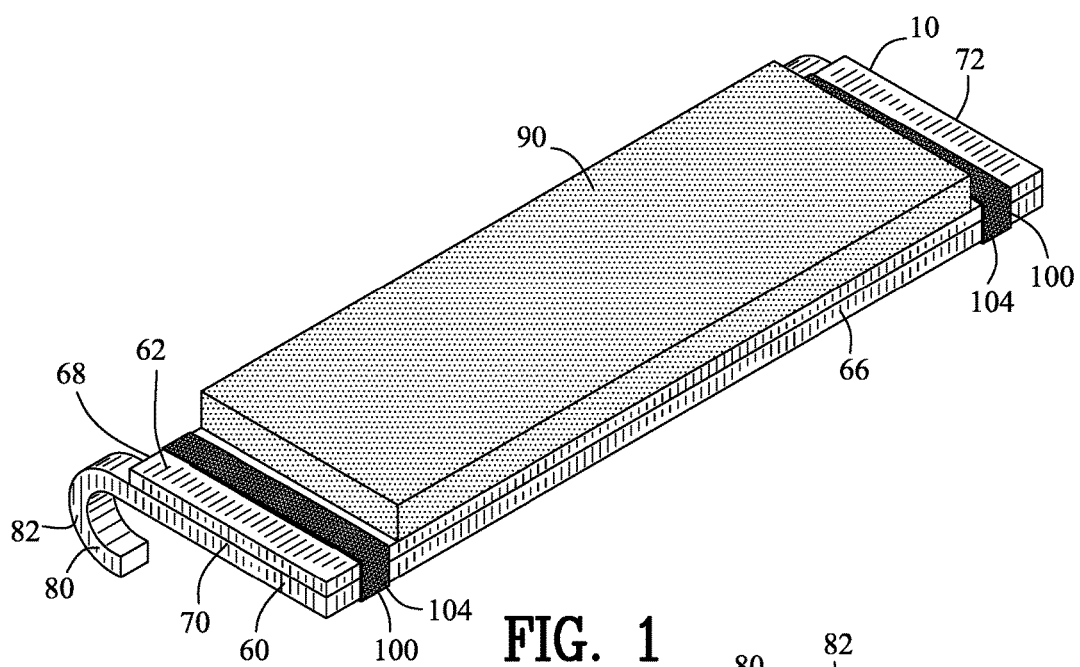
FIG. 1 is an upper front isometric view of a first embodiment for a mobility platform.
Figure 2:
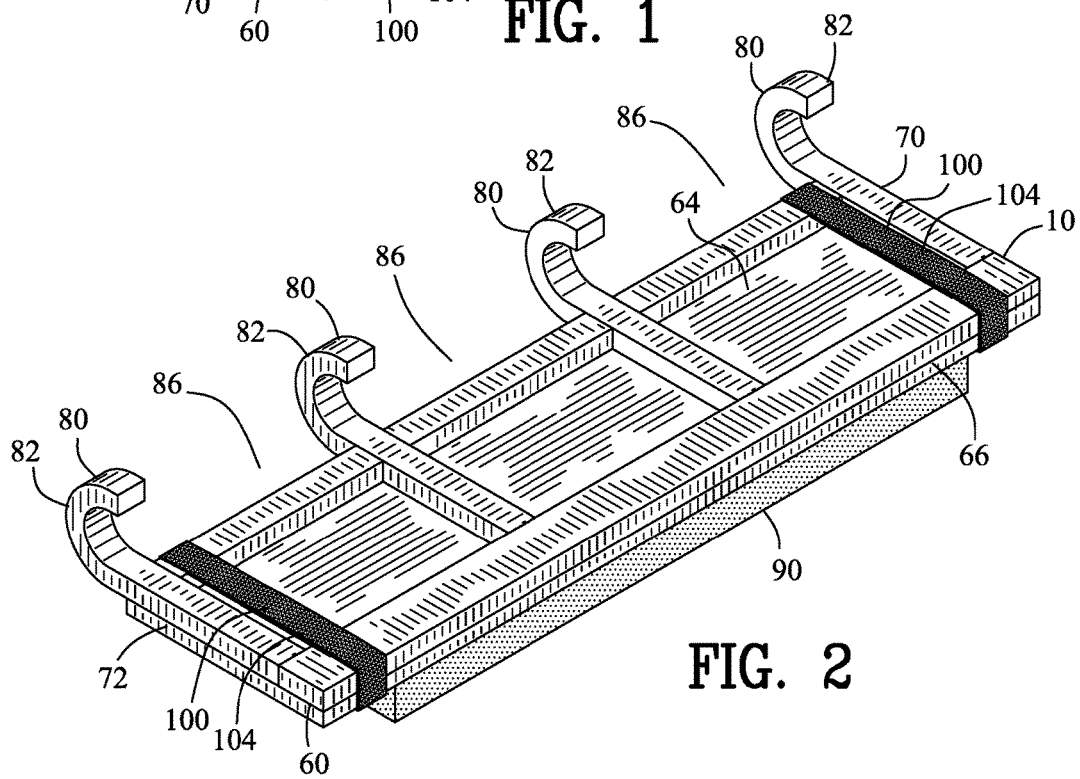
FIG. 2 is a lower front isometric view of FIG. 1.
Figure 9:
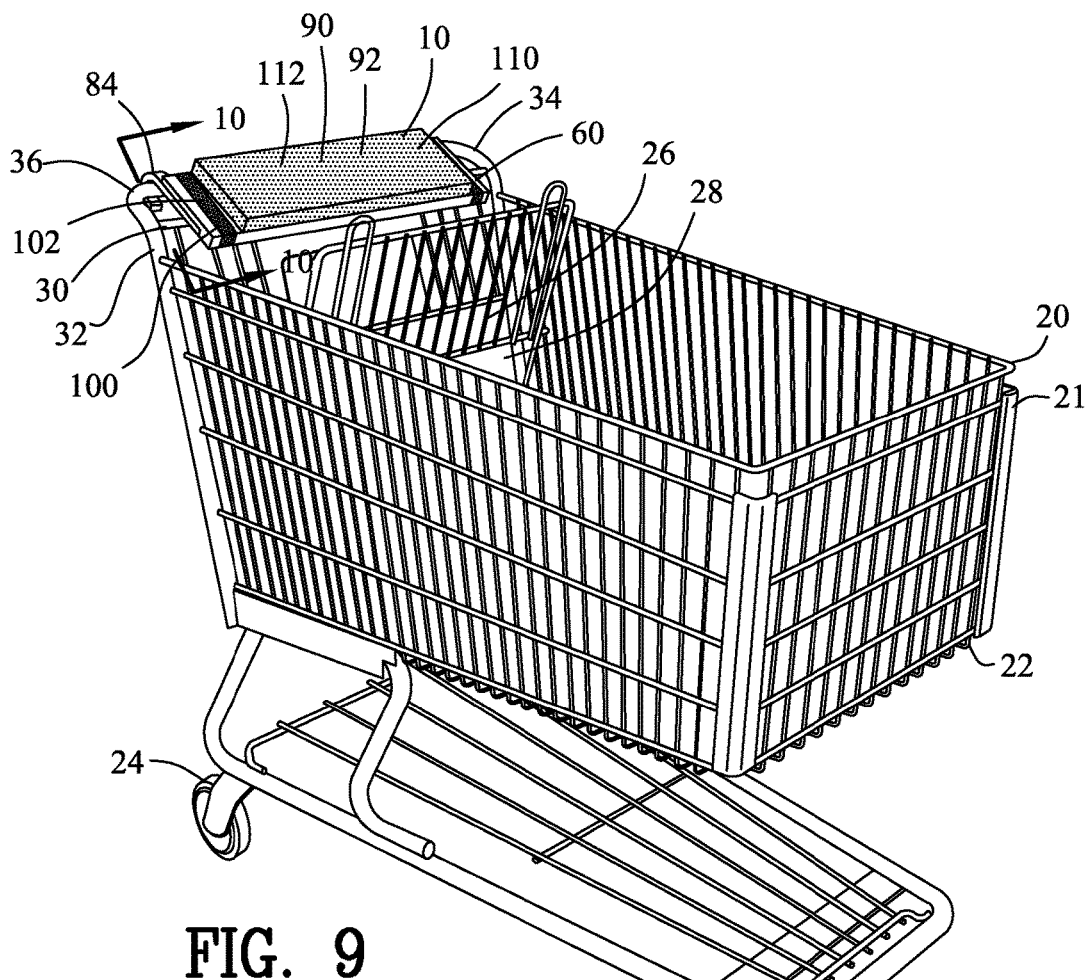
FIG. 9 is a view of the mobility platform of FIG. 1 engaging a shopping cart.
Figure 10:
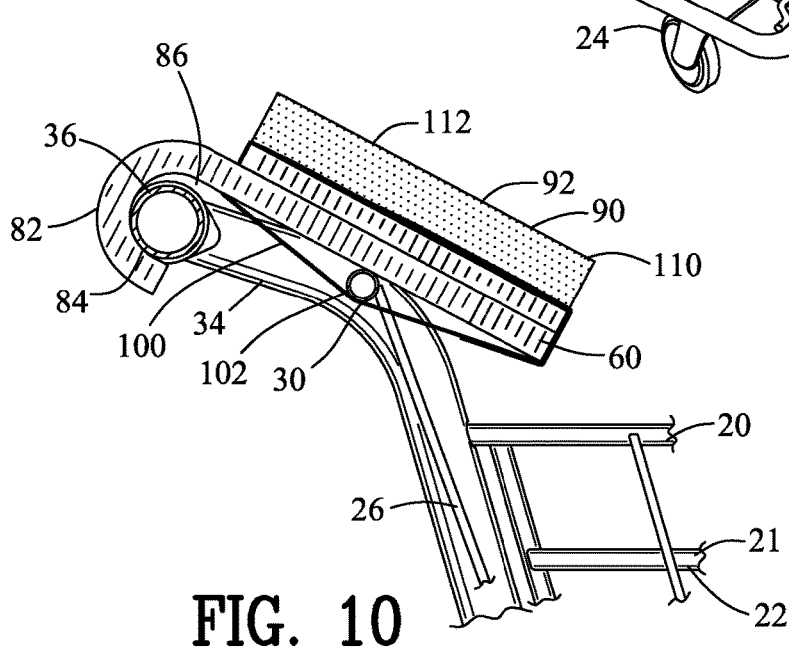
FIG. 10 is a sectional view along line 10-10 in FIG. 9.
Figure 11:
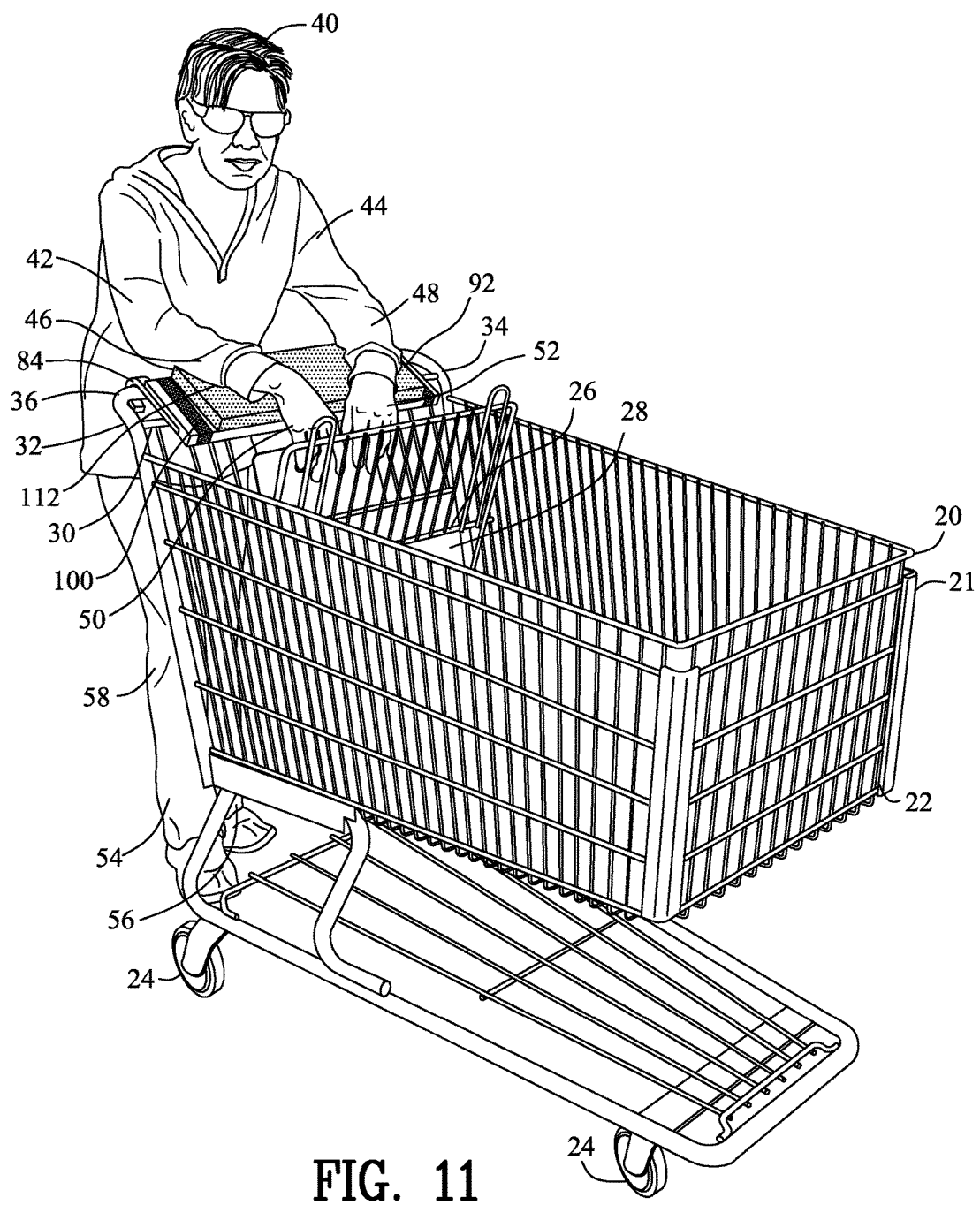
FIG. 11 is a view similar to FIG. 9 illustrating an individual engaging the mobility platform for defining a cart crutch.
Figure 12:
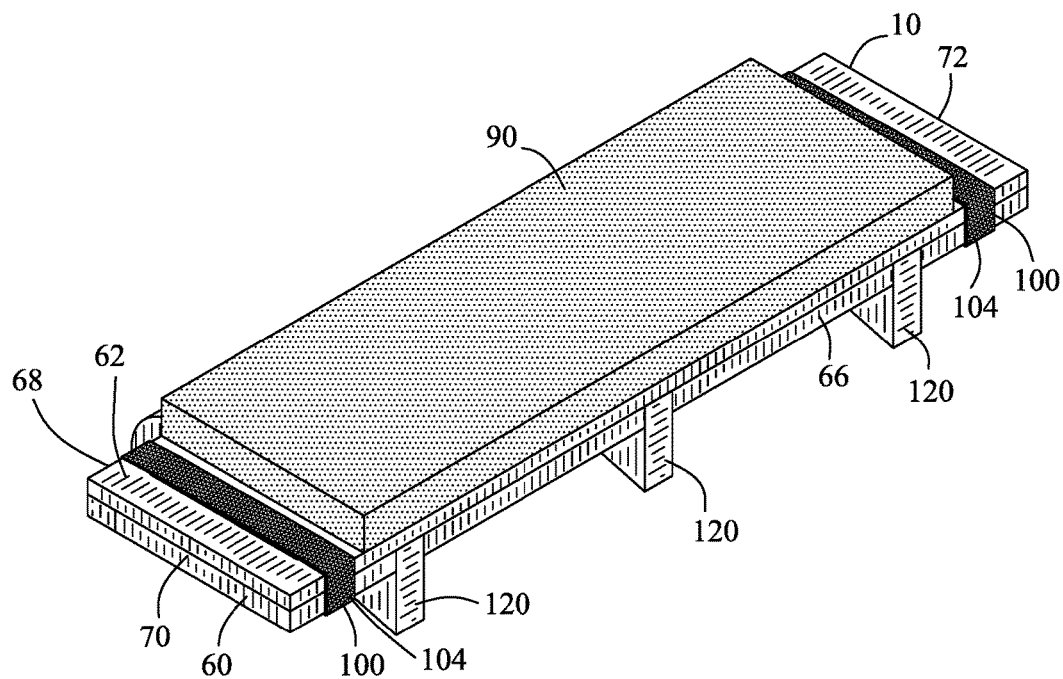
FIG. 12 is an upper front isometric view of a second embodiment for the mobility platform.
Figure 13:
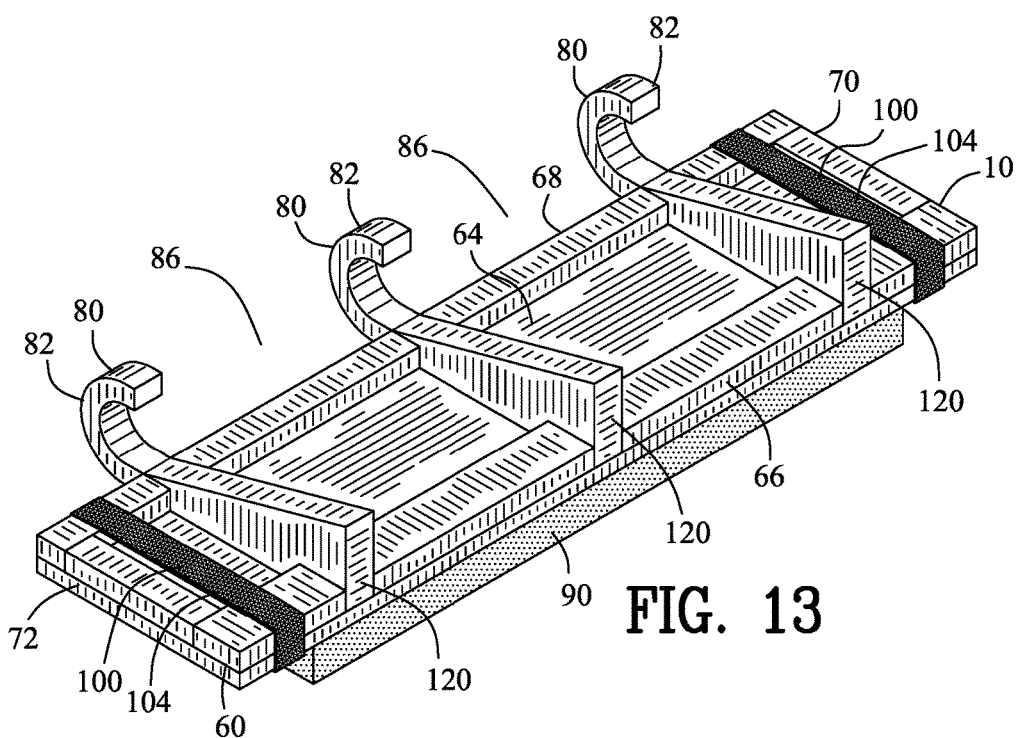
FIG. 13 is a lower front isometric view of FIG. 12.
Figure 18:
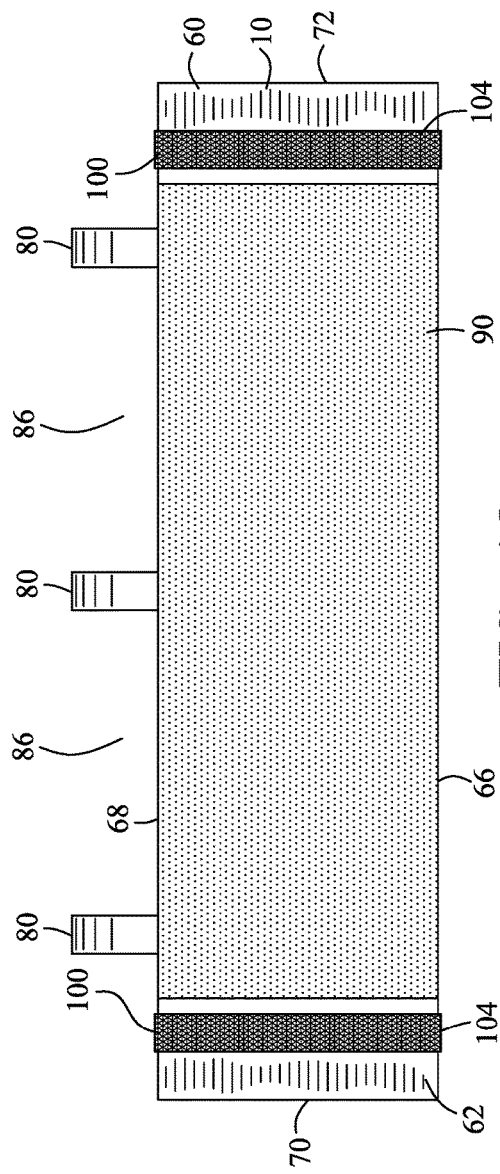
FIG. 18 is a top view of FIG. 12.
Figure 19:
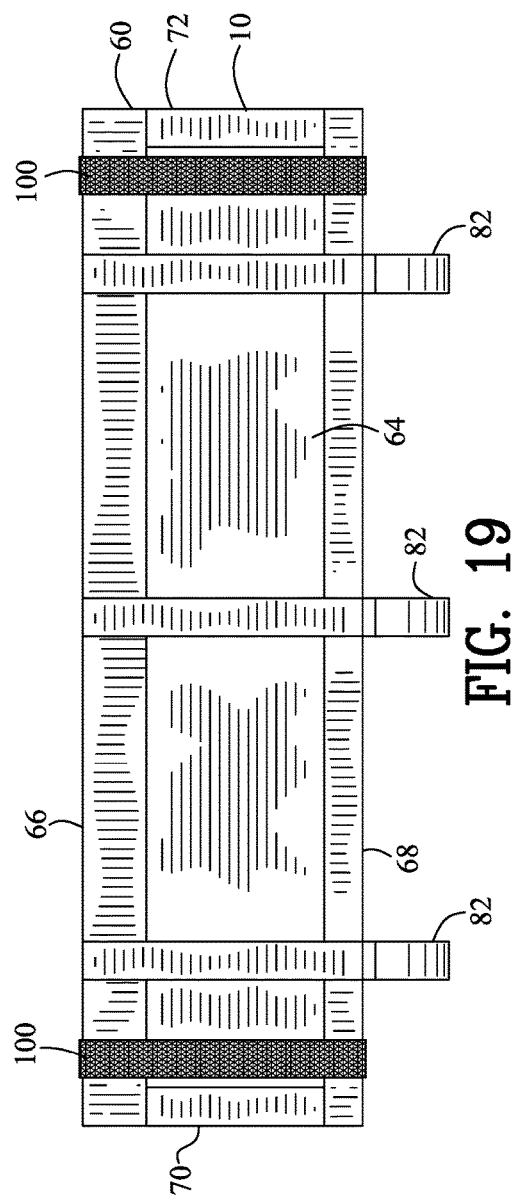
FIG. 19 is a bottom view of FIG. 12.
Figure 20:
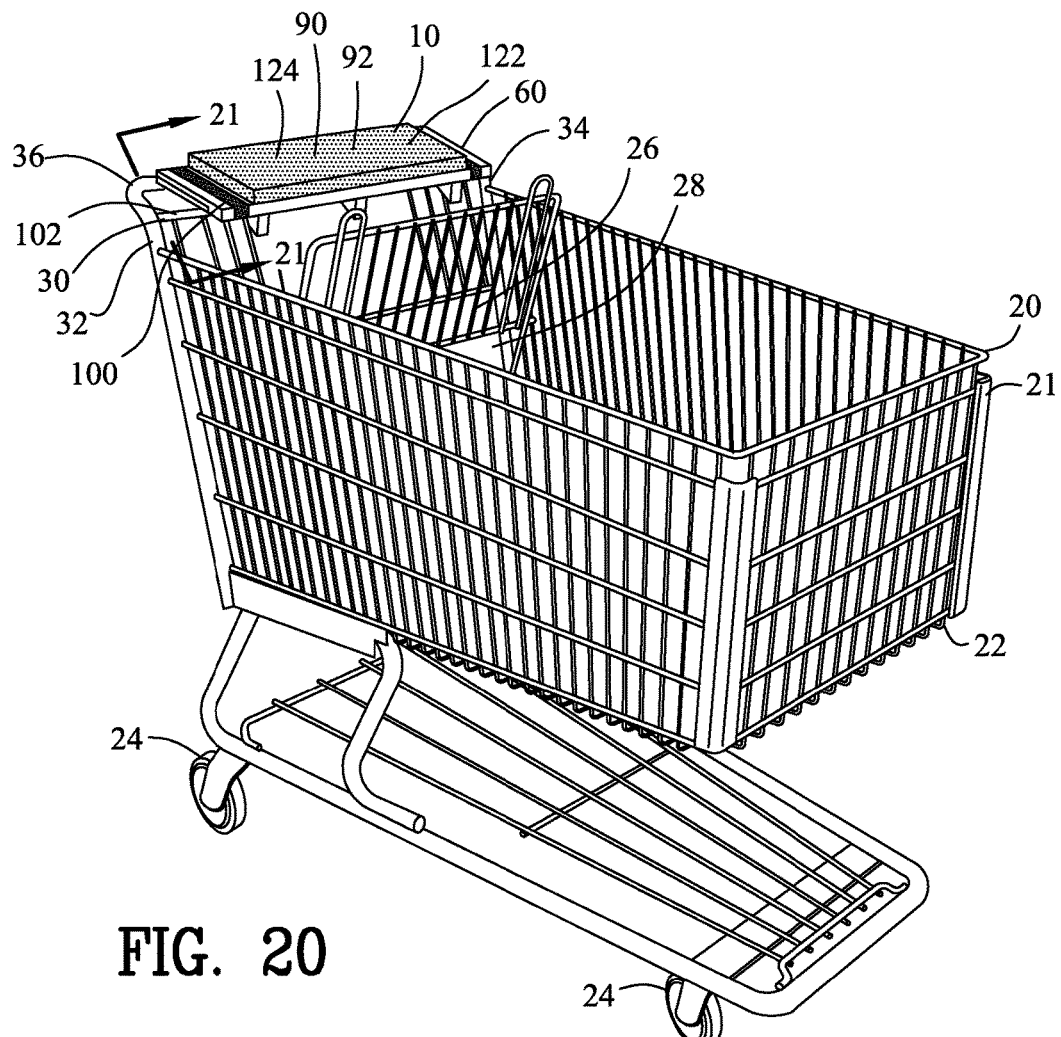
FIG. 20 is a view of the mobility platform of FIG. 12 engaging the shopping cart.
Figure 21:
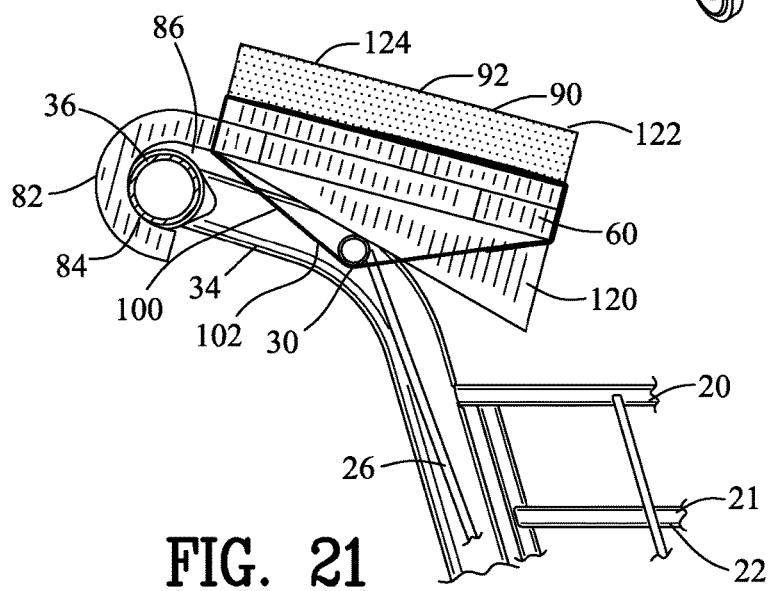
FIG. 21 is a sectional view along line 21-21 in FIG. 20.
Figure 22:
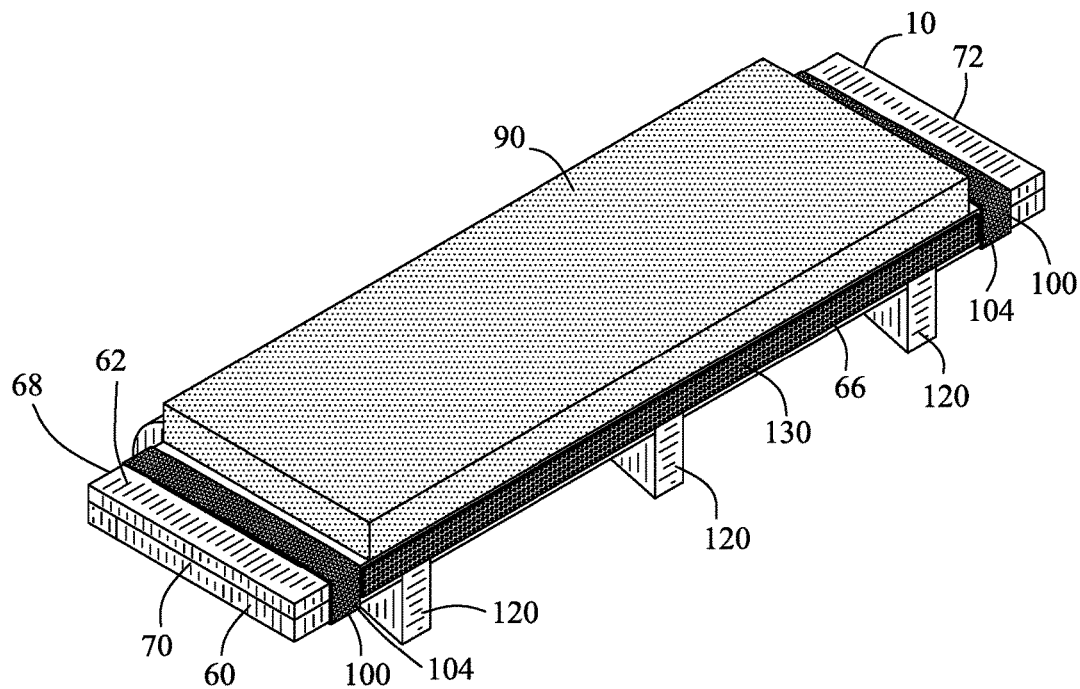
FIG. 22 is an upper front isometric view of a third embodiment for the mobility platform.
Figure 23:
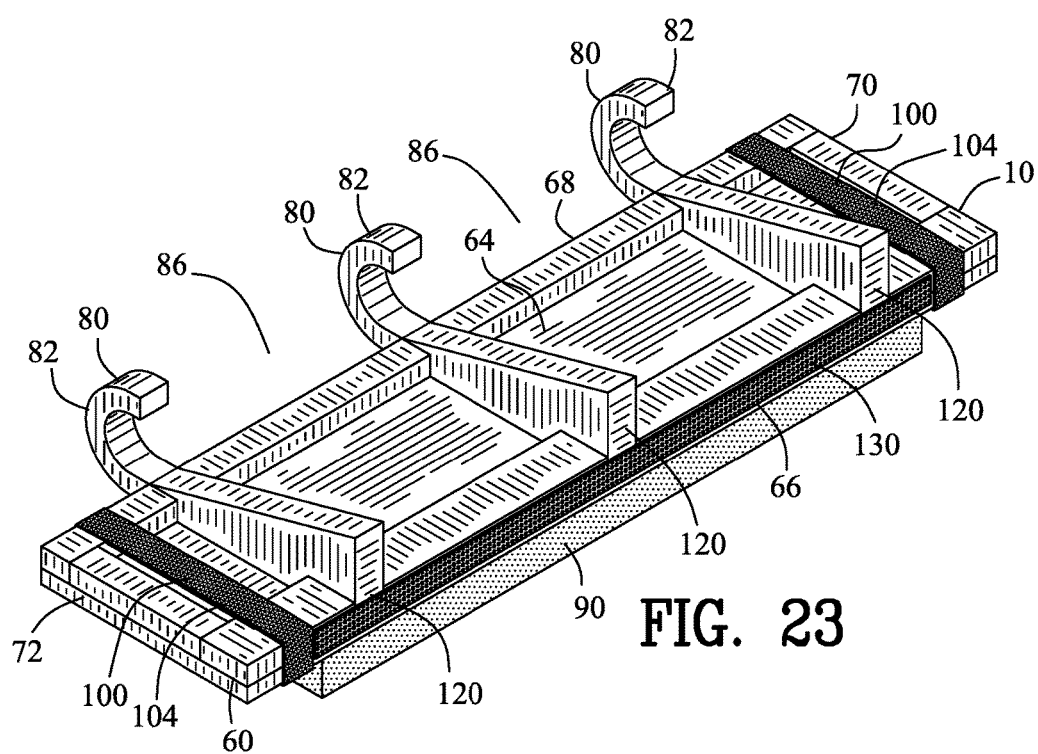
FIG. 23 is a lower front isometric view of FIG. 22.
Figure 30:
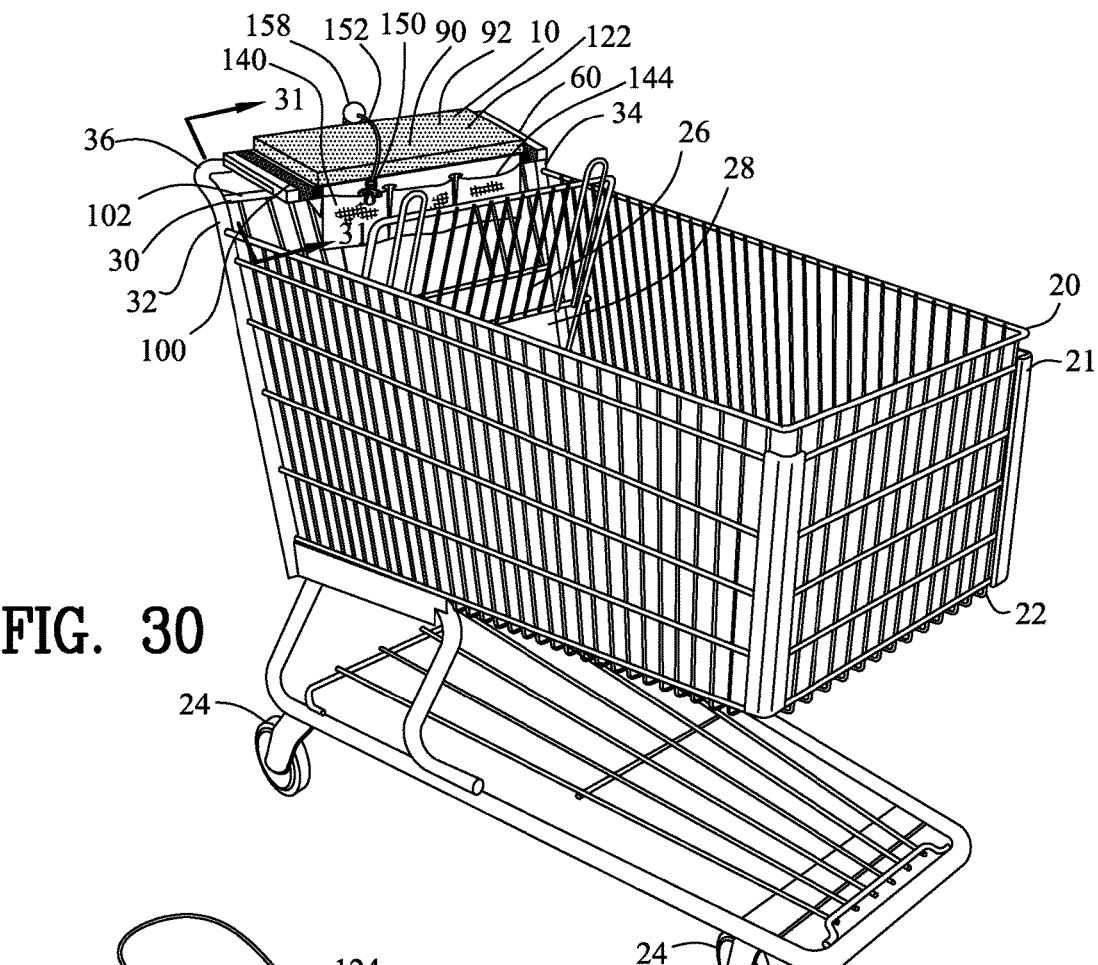
FIG. 30 is a view of the mobility platform of FIG. 22 engaging the shopping cart.
Figure 31:
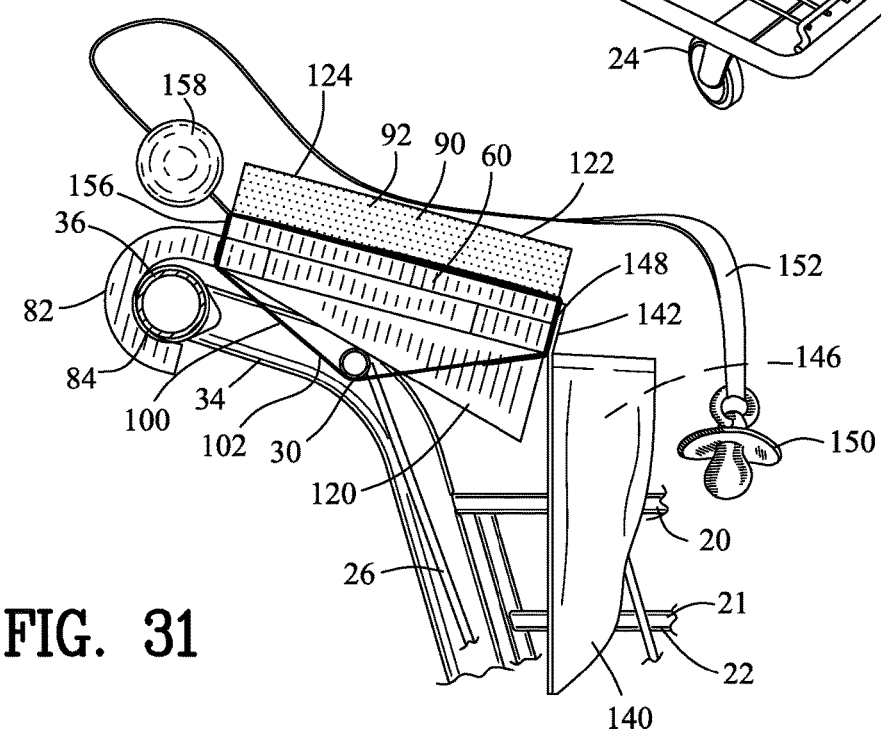
FIG. 31 is a sectional view along line 31-31 in FIG. 30.

FIGS. 1-31 illustrate a mobility platform 10 for a cart 20. As shown in FIGS. 9-11, 20 and 21, illustrate the cart 20 may include a shopping cart 21 may include a cart basket 22 supported by a plurality of wheels 24. The cart basket 22 may include a pivoting closure wall 26 that pivots relative to a basket aperture 28 within the cart basket 22. The pivoting closure wall 26 pivots on a rear pivot bar 30. The rear pivot bar 30 extends between a first side mount 32 and a second side mount 34. A cart handle 36 also extends between the first side mount 32 and the second side mount 34.

The individual 40 includes a first arm 42, a second arm 44, a first forearm 46, a second forearm 48, a first-hand 50, a secondhand duty to, a first leg 54, a second leg 56 and have a weight 58. The individual 40 may propel the shopping cart 20 by utilizing the first hand 50 and the second hand 52 grasping the cart handle 36.

As shown in FIGS. 1-21, the mobility platform 10 comprisfes a platform 60 having an upper surface 62, a lower surface 64, a front edge 66, a rear edge 68, a primary side 70 and a secondary side 72. A connector 80 is secured to the platform 60. The connector 80 may include a plurality of hooks 82 extending from the rear edge 68 and below the lower surface 64. The plurality of hooks 82 encircle a portion of the cart handle 36 and the lower surface 64 of the platform 60 abuts the rear pivot bar 30 for defining a platform lock 84 and terminating displacement of the platform 60 relative to the shopping cart 20.

The plurality of hooks 82 displace the platform 60 forward of the cart handle 36 for defining one or more hand apertures 86 relative to the platform 60, the plurality of hooks 82 and the cart handle 36. The hand apertures 86 permitting the individual 40 to grasp the cart handle 36 when the platform 60 engages the cart handle 36. Preferably, the platform 60 and the plurality of hooks 82 are constructed from an integral one piece unit of polymeric material. However, the platform 60 and the plurality of hooks 82 maybe constructed from other suitable rigid materials.

A deformable layer 90 is coupled to the upper surface 62 of the platform 60 for cushioning contact between the platform 60 and the individual 40. More specifically, the deformable layer 90 may include a foam, rubber or other cushion materials. The deformable layer 90 engages the individual 40 for defining a cart crutch 92. The cart crutch 92 assists the individual 40 by transferring weight 58 of the individual 40 to the shopping cart 20. In addition, the cart crutch 92 improves the balance of the individual 40 while in contact with the deformable layer 90.

The mobility platform 10 may further include a plurality of straps 100. The plurality of straps 100 are secured to the platform 60. The plurality of straps 100 engage the rear pivot bar 30 of the shopping cart 21 for defining a second platform lock 102 and terminating displacement of the platform 60 relative to the shopping cart 21. Preferably, the plurality of straps 100 include a first and second hook and loop strap 104. However, the plurality of straps 100 may alternatively include an elastic band, nylon straps with strap locks. The combination between the plurality of hooks 82 and the plurality of straps 100 permits in the expedited installation and removal of the mobility platform 10 from the shopping cart 20. In addition, the combination between the plurality of hooks 82 and the plurality of straps 100 provides a static engagement between the mobility platform 10 and the shopping cart 20.

FIGS. 1-11 illustrate a first embodiment of the mobility platform 10. The platform 60 defines a generally descending orientation 110. The generally descending, orientation 110 provides a parallel orientation 112 between the deformable layer 90 and the individual's 40 first forearm 46 and the second forearm 48 as the individual 70 is in a standing position. The individual 40 may also place any portion of the individual's 40 first arm 42 and/or second arm 44, including the first hand 50 and the second hand 52 on the deformable layer 90.

FIGS. 12-21 illustrate a second embodiment of the mobility platform 10. A plurality of taper blocks 120 are coupled to the lower surface 64. The plurality of taper blocs 120 engage the rear pivot bar 30 of the shopping cart 20 for positioning the platform 60 in a generally horizontal orientation 122. The generally horizontal orientation 122 provides a perpendicular orientation 124 between the deformable layer 90 and the individual's 40 first forearm 46 and the second forearm 48 as the individual 70 is in a standing position. The individual 40 may also place any portion of the individual's 40 first arm 42 and/or second arm 44, including the first hand 50 and the second hand 52 on the deformable layer 90. Preferably, the platform 60, the plurality of hooks 82 and the plurality of taper blocks 120 are constructed from an integral one piece unit of polymeric material. However, the platform 60, the plurality of hooks 82 and plurality of taper blocks 120 maybe constructed from other suitable rigid materials.

FIGS. 22-37 illustrate a third embodiment of the mobility platform 10. A front edge coupling device 130 is coupled to the front edge 66 of the platform 60. Similarly, a rear edge coupling device 132 is coupled to the rear edge 68. Preferably, the front edge coupling device 130 and the rear edge coupling device 132 are constructed of a hook or loop strip.

A pouch 140 defining a pouch chamber 146 provides storage of pouch items 147. The pouch items 147 may include keys, electronic devices, shopping list, coupons, hand towels or other items. A pouch 140 may include a pouch strip 142 having a plurality of pouches 144 for storage of multiple pouch items 147. A pouch coupling device 148 is coupled to the pouch 140. The pouch coupling device 148 may include a hook or loop strip. The pouch coupling device 148 engages with the either the front edge coupling device 130 or the rear edge coupling device 132 for coupling the pouch 140 to the platform 60.

An amusement item 150 or a plurality of amusement items 154 may be provided for entertaining a child sitting in the cart 20. The amusement item 150 may include a pacifier, baby-raddler, or other toys. An amusement tether 152 is secured to the amusement item 150. An amusement coupling device 156 is coupled to the amusement tether 152. The amusement coupling device 156 may include a hook or loop strip. The amusement coupling device 156 engages with the either the front edge coupling device 130 or the rear edge coupling device 132 for coupling the amusement coupling device 156 to the platform 60. An anti-choke device 158 may be coupled to the amusement tether 152 for preventing a child from swallowing the amusement coupling device 156 and choking. The anti-choke device 158 may include a ball, ring or other large object.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A mobility platform for a cart, the cart having a cart basket supported by a plurality of wheels and a cart handle for the individual to propel the cart, the mobility platform, comprising:

a platform having an upper surface, a lower surface, a front edge, a rear edge, a primary side and a secondary side;

a connector secured to said platform and engaging the cart handle for abutting said lower surface of said platform with the cart handle;

a deformable layer coupled to said upper surface of said platform for cushioning contact between said platform and the individual;

said platform improving the balance and support of the individual while in contact with said deformable layer; and a plurality of taper blocks coupled to said lower surface for engaging the cart.

2. A mobility platform for a cart as set forth in claim 1, wherein said connector includes a plurality of hooks extending from said rear edge and below said lower surface for encircling a portion of the cart handle.

3. A mobility platform for a cart as set forth in claim 2, wherein said plurality of hooks displacing said platform forward of the cart handle for defining an aperture relative to said platform, said plurality of hooks and the cart handle; and said aperture permitting the individual to grasp the cart handle when said platform engages the cart handle.

4. A mobility platform for a cart as set forth in claim 1, wherein said platform defines a descending orientation for paralleling a first forearm and a second forearm of the individual while in contact with said deformable layer.

5. A mobility platform for a cart as set forth in claim 1, further including a plurality of straps secured to said platform; and said plurality of straps engaging the cart for defining a second platform lock and terminating displacement of said platform relative to the cart.

6. A mobility platform for a cart as set forth in claim 1, further including a pouch defining a pouch chamber for providing storage; and a pouch coupling device for coupling said pouch to said platform.

7. A mobility platform for a cart as set forth in claim 1, further including an amusement item for providing entertainment;

an amusement tether secured to said amusement item; and an amusement coupling device for coupling said amusement tether to said platform.

8. A mobility platform for a cart as set forth in claim 7, further including an anti-choke ball coupled to said amusement tether for preventing choking.

9. A mobility platform for a shopping cart, the shopping cart having a cart basket supported by a plurality of wheels, a cart handle and a rear pivot bar extending between a first side mount and a second side mount, the individual grasping the cart handle to propel the shopping cart, the mobility platform, comprising:

a platform having an upper surface, a lower surface, a front edge, a rear edge, a primary side and a secondary side;

a plurality of hooks extending from said rear edge and below said lower surface and engaging the cart handle for abutting said lower surface of said platform with the cart handle;

a deformable layer coupled to said upper surface of said platform for cushioning contact between said platform and the individual;

said platform improving the balance and support of the individual while in contact with said deformable layer, and a plurality of taper blocks coupled to said lower surface and engaging the rear pivot bar of the shopping cart.

10. A mobility platform for a shopping cart as set forth in claim 9, wherein said plurality of hooks displacing said platform forward of the cart handle for defining an aperture relative to said platform, said plurality of hooks and the cart handle; and said aperture permitting the individual to grasp the cart handle when said platform engages the cart handle.

11. A mobility platform for a shopping cart as set forth in claim 9, further including a plurality of straps secured to said platform; and said plurality of straps engaging the rear pivot bar of the shopping cart for defining a second platform lock and terminating displacement of said platform relative to the shopping cart.

12. A mobility platform for a shopping cart, the shopping cart having a cart basket supported by a plurality of wheels, a cart handle and a rear pivot bar extending between a first side mount and a second side mount, the individual grasping the cart handle to propel the shopping cart, the mobility platform, comprising:

a platform having an upper surface, a lower surface, a front edge, a rear edge, a primary side and a secondary side;

a plurality of hooks extending from said rear edge and below said lower surface and encircling a portion of the cart handle and said lower surface of said platform abutting the rear pivot bar;

a deformable layer coupled to said upper surface of said platform for cushioning contact between said platform and the individual;

said platform improving the balance and support of the individual while in contact with said deformable layer;

a plurality of straps secured to said platform;

said plurality of straps engaging the rear pivot bar of the cart for defining a second platform lock and terminating displacement of said platform relative to the shopping cart;

a plurality of taper blocks coupled to said lower surface;

said plurality of taper blocks engaging the rear pivot bar of the shopping cart;

said plurality of hooks displacing said platform forward of the cart handle for defining an aperture relative to said platform, said plurality of hooks and the cart handle; and said aperture permitting the individual to grasp the cart handle when said platform engages the cart handle.

13. A mobility platform for a cart, the cart having a cart basket supported by a plurality of wheels and a cart handle for the individual to propel the cart, the mobility platform, comprising:

a platform having an upper surface, a lower surface, a front edge, a rear edge, a primary side and a secondary side;

a connector secured to said platform and engaging the cart handle for abutting said lower surface of said platform with the cart handle;

a deformable layer coupled to said upper surface of said platform for cushioning contact between said platform and the individual;

said platform improving the balance and support of the individual while in contact with said deformable layer;

said connector displacing said platform forward of the cart handle for defining an aperture relative to said platform, said plurality of hooks and the cart handle; and said aperture permitting the individual to grasp the cart handle when said platform engages the cart handle.

* * * * *